Fig. 3

INVENTOR.
CHARLES V. WILHERE
BY
*Brown, Critchlow, Flick & Peckham*
ATTORNEYS.

Fig. 10

United States Patent Office 3,441,066
Patented Apr. 29, 1969

3,441,066
ROTARY FILLING APPARATUS WITH FLUIDIC VALVES
Charles V. Wilhere, Pittsburgh, Pa., assignor to Horix Manufacturing Company, Pittsburgh, Pa., a corporation of Pennsylvania
Filed Dec. 29, 1966, Ser. No. 605,916
Int. Cl. B65b 43/50, 43/54
U.S. Cl. 141—148      6 Claims

ABSTRACT OF THE DISCLOSURE

This invention relates to apparatus for filling containers with a liquid product, in which the flow of liquid through the filling nozzles is controlled by fluidic valves of the Coando-effect (i.e., wall-effect) type. Each valve has an inlet and two outlets. The inlet is connected to a source of the liquid product under pressure; one outlet is connected to the filling nozzle and the other to a tank for recirculating liquid. Liquid flows continuously through one or the other of these outlets, depending upon the closed or open condition of two control passages that form part of the valve. When the first control passage is closed and the second control passage is open, the discharge from the valve goes to the filling nozzle. However, when either the first control passage is open or the second control passage is closed, the valve discharges to the recirculating tank.

---

The present invention is directed to the application of such a valve to a rotary type filling machine, in which liquid will be diverted to the filling nozzles only when all of the following conditions are satisfied: (a) a container has been initially presented to the filling nozzle, (b) the container has been elevated relative to the nozzle into final filling position and remains in that position, and (c) the container has not been filled above a predetermined level. These results are obtained by providing (i) two control ports in the first control passage of the valve, the first port being closed when condition (a) is satisfied and the second port being closed when condition (b) is satisfied, and (ii) a single port in the second control passage that is open when condition (c) is satisfied.

Background of the invention

Although a fluidic valve has many advantages over mechanical valves in simplicity of operation and in the absence of moving parts, there are several problems in using these valves in rotary filling machines.

One problem is to assure that the valve will operate to divert liquid to the filling nozzle only when a container is presented for filling and then only after the container has been raised relative to the nozzle into its final filling position.

Another problem is to assure that the flow of liquid through the filling nozzle will be cut off when the liquid level in the container rises above a predetermined height and will resume if the level drops because of the subsidence of turbulence and splash but will not resume if the level drops because of lowering a filled container relative to the nozzle.

It is among the objects of the present invention not only to provide solutions to the above problems but to do so in a way that will be simple to manufacture, reliable in service, and adaptable with little or no adjustment to a variety of container sizes.

Summary of the invention

In accordance with the present invention, liquid filling apparatus of the rotary type is provided with a plurality of filling nozzles that are supported for rotation about a central vertical axis. Each nozzle is connected to a separate fluidic valve (of the wall-effect type) having an inlet, two outlets, and two control passages. The valve connects a source of liquid product under pressure (a) to its associated nozzle when the first control passage is closed and the second control passage is open, and (b) to a recirculating tank when either the first control passage is open or the second control passage is closed.

The specific improvement covered by the present invention includes the provision of first and second control ports in the first control passage, so that this passage is open if either port is open and is closed only when both ports are closed. Means are provided for closing the first port in response to the presence of a container and its partial elevation into filling position relative to the associated nozzle before the beginning of a filling cycle and for opening the same port in response to the final lowering of the container from its filling position after the end of the filling cycle. Means are provided for closing the second port in response to its associated nozzle reaching a first angular position about the central vertical axis $a$ that corresponds to its angular position just after a container (if present) would normally have been fully elevated to its final filling position relative to that nozzle. Such angular position marks the beginnning of the "filling cycle," as that term is used herein. This second port is held closed until opened in response to the same nozzle reaching a second angular position between said stations corresponding to its position just before a container (if present) would start downward from its final filling position relative to the nozzle. The second angular position marks the end of the filling cycle." In addition, means are provided for closing the second control passage in response to the rise of liquid to a predetermined level in the container being filled.

Brief description of the drawings

A preferred embodiment of the invention is shown in the attached drawings, in which.

Description of the preferred embodiment of the invention

Figure 1:
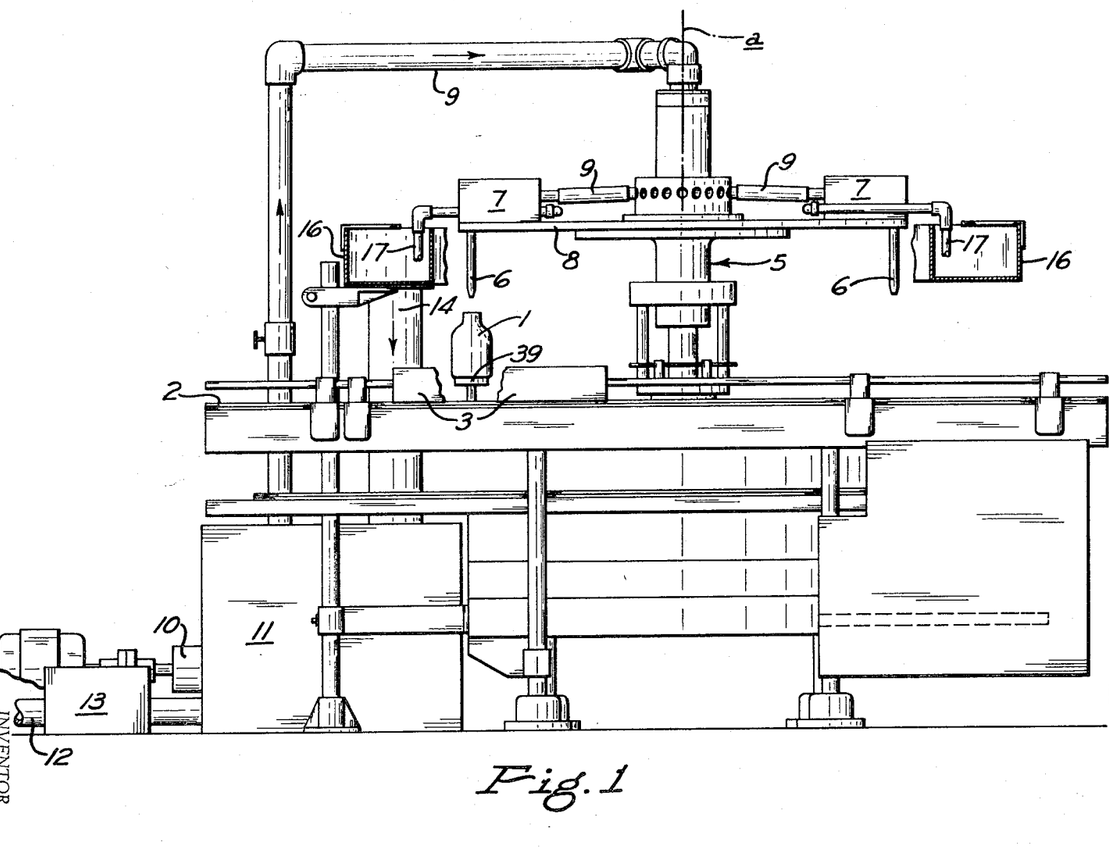
FIG. 1 is a fragmentary elevation, somewhat diagrammatic and partly in section, of a rotary filling machine, showing the general arrangement of such a machine as adapted to the present invention.
Figure 2:
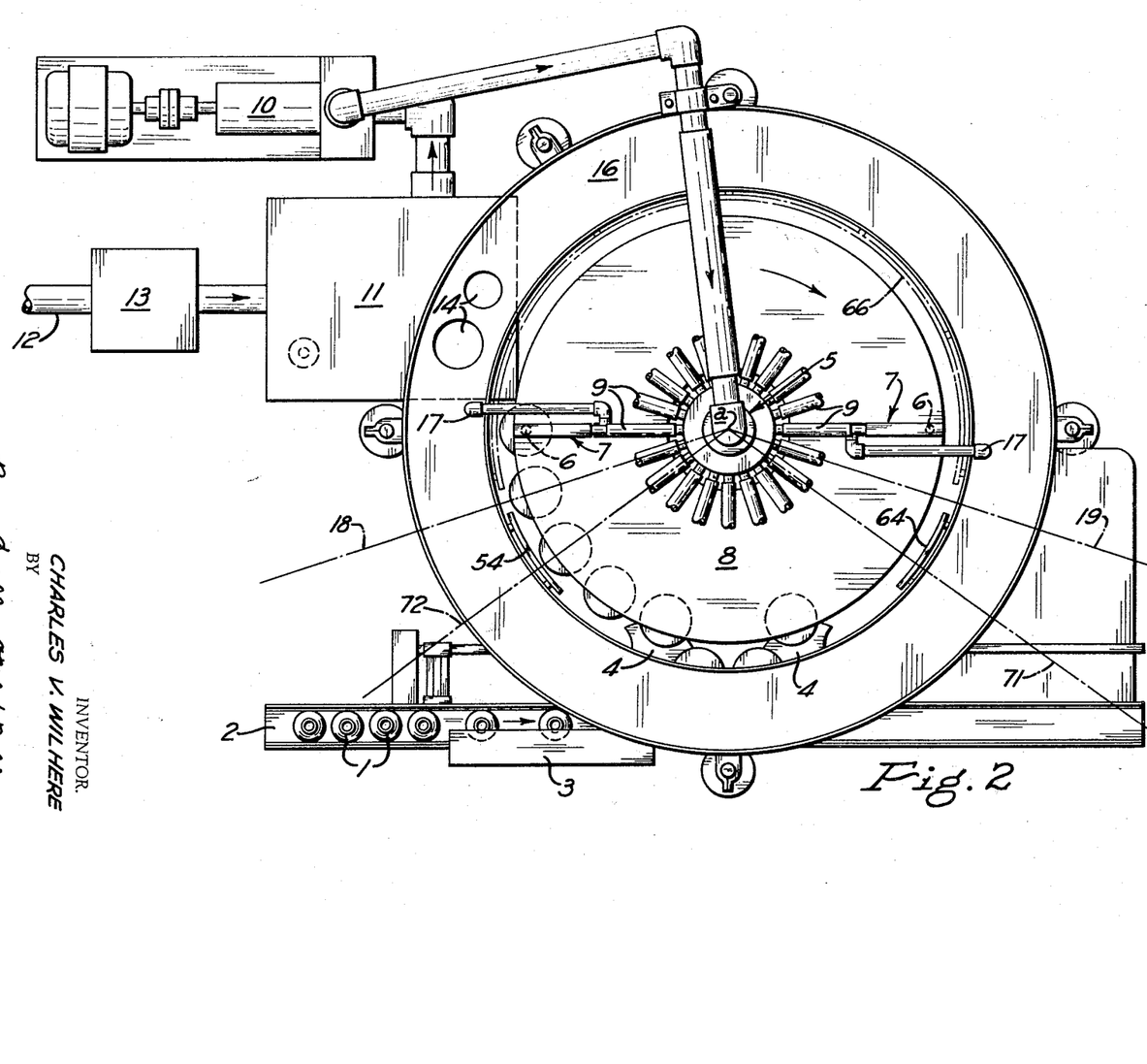
FIG. 2 is a plan view of the apparatus shown in FIG. 1.

Referring to the drawings, FIGS. 1 and 2 show a generally conventional arrangement of a rotary filling machine in which containers 1 on a conveyor 2 are spaced by a conventional feed screw 3 (shown only diagrammatically) and then removed by a star wheel 4 from the conveyor on to a rotary turret 5, which carries the containers around a central vertical axis $a$ and discharges them by a second star wheel back on to the conveyor 2. The machine has a plurality of filling nozzles 6 depending from valve blocks 7. The latter are supported on a circular plate 8, which rotates in synchronism with the containers about the same vertical axis. The valve blocks are supplied with liquid product under pressure through pipes 9 by a pump 10, the inlet of which is connected to a tank 11 for recirculating the liquid product. A suitable liquid level in this tank is maintained by a product feed line 12 and a valve (or pump) 13. The tank also receives through pipes 14 the drainage from a trough 16, into which the liquid product is discharged through outlets 17 when the product is not discharged through the adjacent nozzle 6. The filling cycle begins as the (broken) radial line 18 in FIG. 2 and ends at the (broken) radial line 19.

Figure 3:
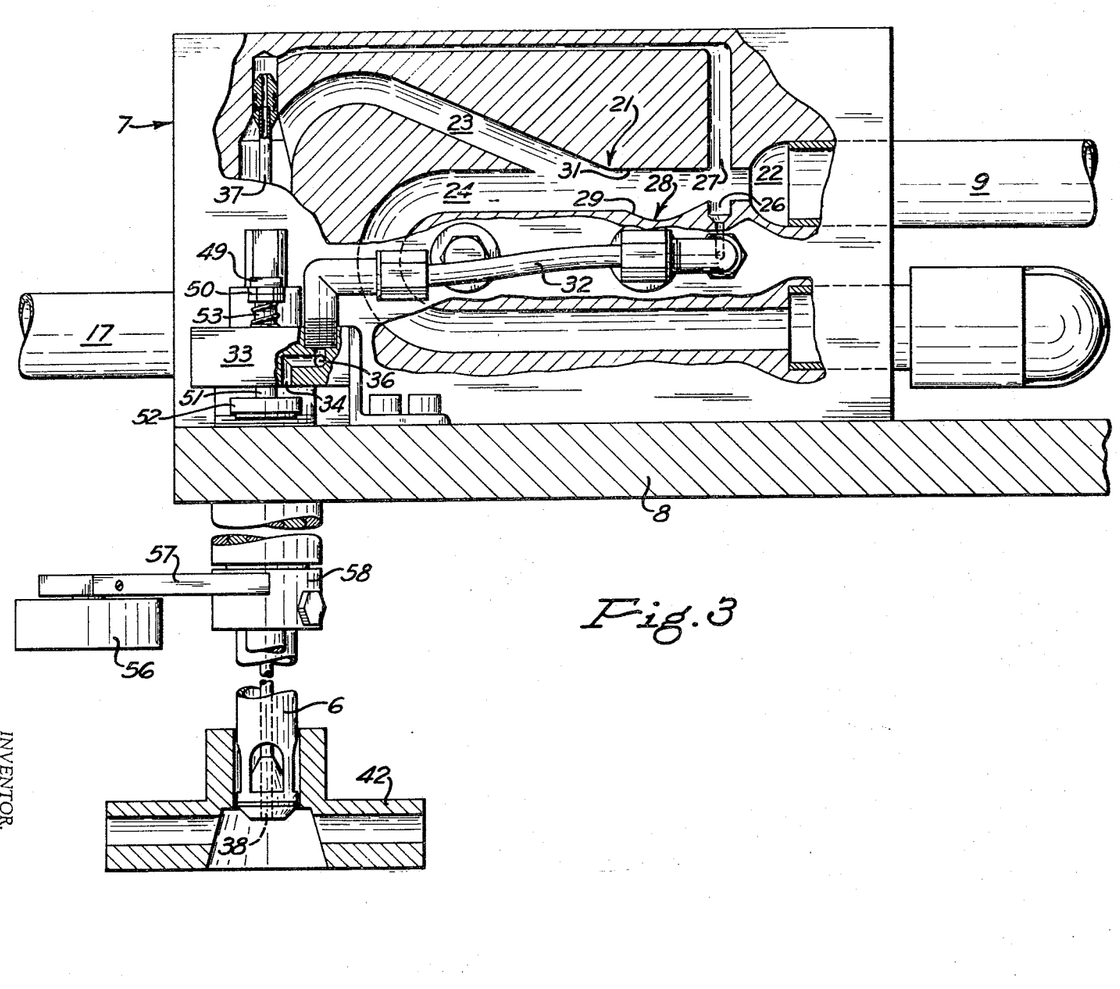
FIG. 3 is an enlarged fragmentary side elevation, partly in section, of one of the filling nozzles shown in FIG. 1 and its associated fluidic valve and container guide.
Figure 4:
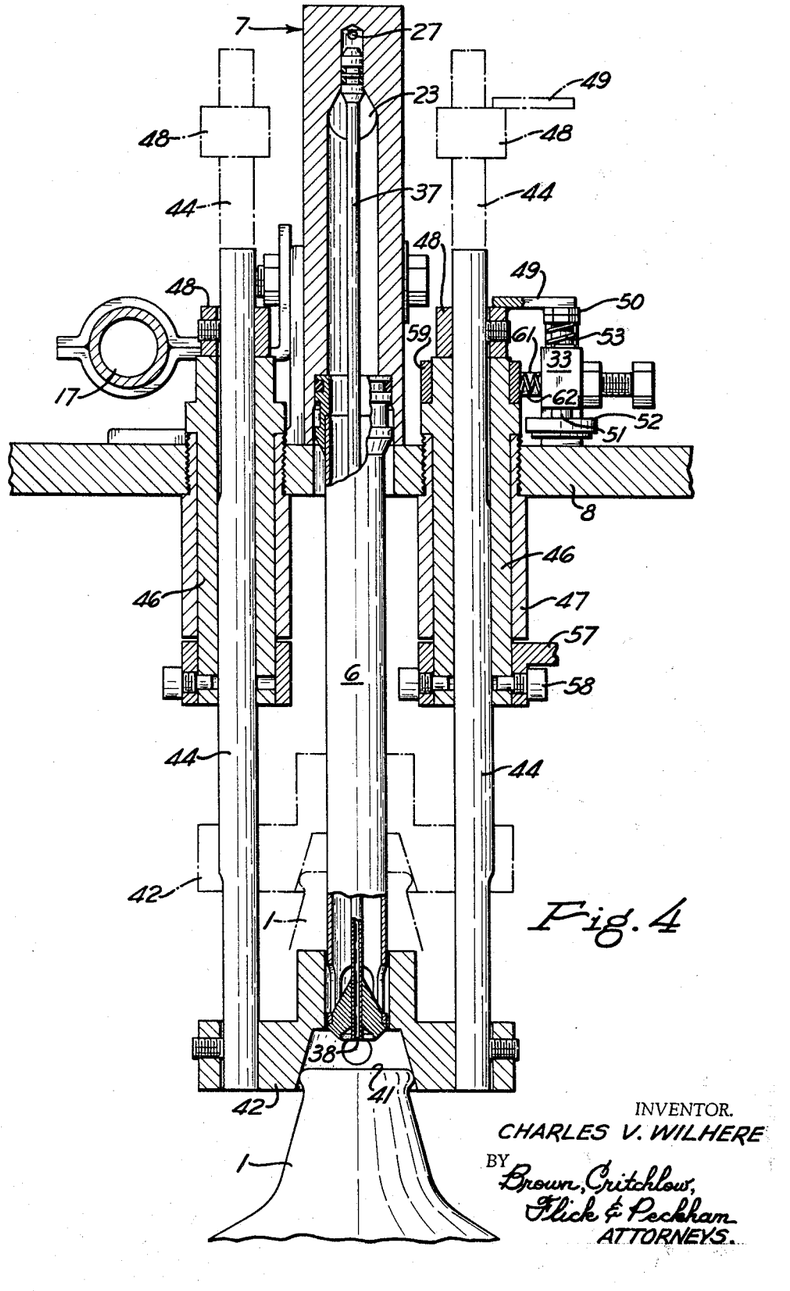
FIG. 4 is an enlarged fragmentary front elevation, partly in section, of the elements shown in FIG. 3.
Figure 5:
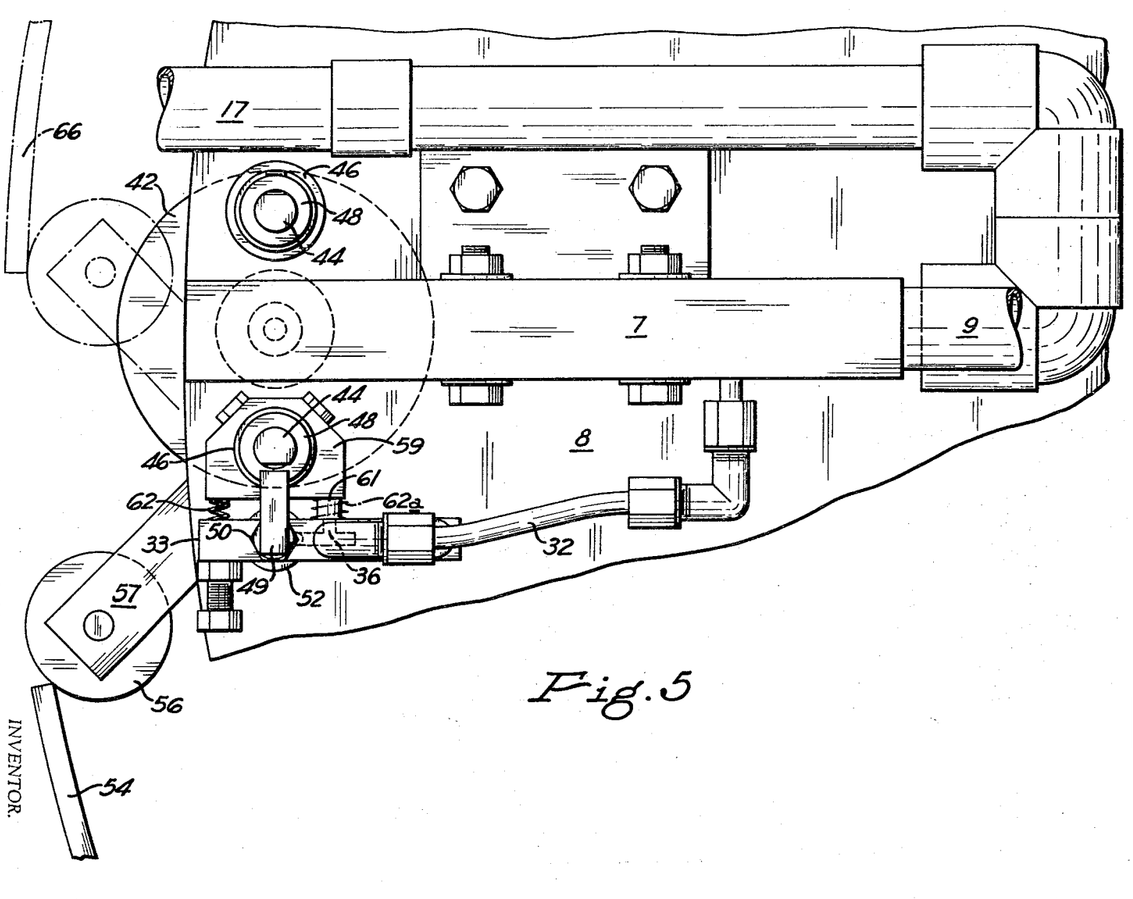
FIG. 5 is a plan view of the same elements.

FIGS. 3, 4 and 5 show details of one of the valve blocks 7 associated with each filling nozzle 6. The passageways formed in the block 7 create what will be recognized as a fluidic device or valve 21 for switching a fluid stream introduced by the inlet 22 to either a nozzle outlet 23 (connected to filling nozzle 6) or a recirculating outlet 24 (connected to outlet 17), depending upon the open or closed condition of a first control passage 26 and a second control passage 27 connected to the valve at diametrically opposite points adjacent the inlet 22. On the bottom wall of this valve between the inlet and outlets is a pocket 28, formed by diverging and then converging wall portions (in the direction of fluid flow). The converging wall portion 29 is directly opposite to and aligned with the bottom wall of the nozzle outlet 23. The recirculating outlet 24 is aligned with the main horizontal axis of the valve and is opposite the inlet 22. In this type of valve, fluid introduced under pressure through inlet 22 will hug the upper straight wall 31 of the valve and discharge liquid through recirculating outlet 24, so long as either the first control passage 26 is open or the second control passage 27 is closed. On the other hand, if passage 26 is closed and passage 27 is open, then fluid will follow the lower wall 28 of the valve and be directed by the converging portion 29 through the nozzle outlet 23.

The first control passage 26 is connected by a pipe 32 to a port member 33, which is provided with two separate openings, herein referred to as sensing or control ports 34 and 36. The second control passage 27 is connected to a tube 37, which extends coaxially inside the filling nozzle 6 and has an open lower end forming a liquid level sensing or control port 38.

When a container enters the rotating turret 5 it rests on a plate 39 (see FIG. 1). During the filling cycle, this plate is elevated by conventional mechanical means relative to the filling nozzle into a final filling position (shown by broken lines in FIG. 4), which it maintains until the end of the filling cycle when it is lowered. (In some cases, which are equivalent to that here described, the containers remain at the same elevation throughout the filling cycle, and the nozzles are lowered before the beginning of the filling cycle and raised after the end of that cycle.) Following the more conventional practice, the container here is raised relative to the apparatus. As the container is raised, its top 41 engages a guide 42 that is supported from plate 8 by guide rods 44 (see FIG. 4). The latter are slidably mounted in sleeve members 46, which are mounted in support members 47 fixed to plate 8. Guide 42 and guide rods 44 are urged by gravity (spring means may be added if desired) to their lowermost position, shown in solid lines in FIG. 4, and prevented from dropping further by stops 48 adjustably secured to the upper ends of the rods. Attached to one of the stops is a bridge element 49 that extends laterally and normally engages and presses down (due to the weight of the container guide and its associated guide rods) upon the head 50 of a stem 51 of a closure member 52. When the bridge element 49 is raised by the presentation and initial (partial) elevation of a container directly below the filling nozzle, a spring 53, extending between the head 50 and port member 33, lifts the closure member 52, so that a portion of its upper face closes port 34 connected to the first control passage 26 (see FIG. 3).

As the container continues to rise relative to the filling nozzle, both the container and nozzle are being rotated by the turret 5 about the central vertical axis a. At some angular position in that rotation, depending upon the characteristics of the filling machine but not upon those of the container, the container will have just been fully elevated into its final filling position relative to the nozzle, as shown in broken lines in FIG. 4. This angular position is indicated in FIG. 2 by the radial line 18. When the nozzle reaches this position, a cam strip 54, supported rotatably mounted on an arm 57. The latter is adjustably secured by a collar 58 to sleeve 46, which is supported for rotation about guide rod 44 (see FIG. 4). On the upper end of this sleeve is adjustably mounted a rocker 59 provided with a laterally extending closure stud 61. The rocker is normally urged by an adjustable spring 62 into the position shown in FIG. 5, in which the stud 61 closes the second port 36 of the first control passage 26. Cam 54 is positioned to engage the cam follower 56, so as to open port 36 during the entire interval in which the container is rising relative to the nozzle 6 and until that nozzle reaches the radial line 18. When the nozzle reaches the latter position, the cam follower leaves the cam, and spring 62 returns rocker 59 to the position shown in FIG. 5 to again close port 36. Accordingly, ports 34 and 36 are both closed only (a) after a container has been presented below a filling nozzle and partially raised (indicating the presence of a container), and (b) after the container has been raised into its final filling position. Only then does the fluidic valve 21 switch the liquid product from the recirculating outlet 24 to the nozzle outlet 23 and begin filling the container.

Liquid will continue to flow through nozzle outlet 23 of valve 21 until cam follower 56 engages a similar cam strip 64 when the filling nozzle has reached an angular position, indicated by the radial line 19 in FIG. 2, corresponding to the position of the nozzle at the end of the filling cycle just before the container starts downward from its final filling position. Port 36 is then reopened to switch the flow of liquid from nozzle outlet 23 to recirculating outlet 24.

When the container is finally lowered after the end of the filling cycle, bridge element 49 will again press down on the head 50 of stem 51 of closure member 52 to open port 34. This port remains open until the presentation and initial elevation of another container just before the beginning of the next filling cycle. It will be noted, therefore, that the first control passage 26 is closed only when both ports 34 and 36 are closed and that this occurs only during the filling cycle when a container has reached its final filling position relative to the nozzle and remains in that position.

Alternatively, the same result can be obtained by reversing the cam and spring means that open and close port 36. For example, a spring 62a (shown in broken lines in FIG. 5) can urge rocker 59 to open port 36, except when the rocker is rotated counter-clockwise to close that port by engagement of cam follower 56a on an arm 57a (normally positioned about 90° from the position of arm 57) with a single cam strip 66 (shown in broken lines in FIGS. 2 and 5) that extends between the radial lines 18 and 19. In this alternative case, as under the conditions described in the preceding paragraphs, port 36 will be closed only during the period in which a container has been raised to its fully elevated position relative to the filling nozzle and remains in that position, i.e., during the filling cycle. It will be obvious that, after a container has been fully lowered at the end of a filling cycle and before the next container is partially raised, fluid will not be diverted to the nozzle outlet 23 so long as either port 34 or port 36 is open.

Figure 6:
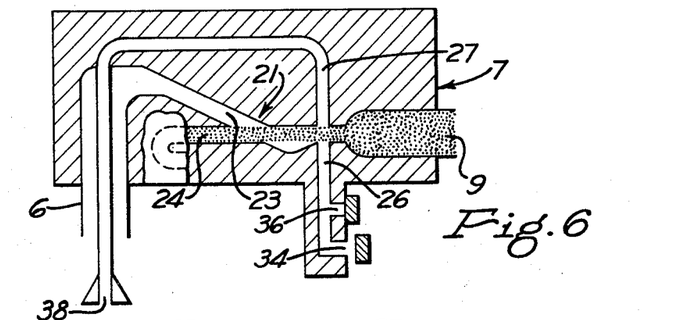
FIGS. 6–10 are schematic representations showing the flow through one of the fluidic valves under various operating conditions.

FIGS. 6–10 illustrate diagrammatically the flow through the fluidic valve 21 under the various conditions discussed above. In FIG. 6, port 34 is open and port 36 is closed, so that control passage 26 is open. This is the condition that prevails for a given filling nozzle in its clockwise traverse (looking at FIG. 2) of the arcuate segment between the radial lines 71 and 72, which correspond respectively to the positions of the nozzle when an associated container is at its lowermost position at the end of one filling cycle and at the beginning of the next. (If the alternative cam arrangement suggested above is used, then both ports 34 and 36 would be open during this same traverse.) In either case, fluid will be discharged from the fluidic valve through recirculating outlet 24.

Figure 7:
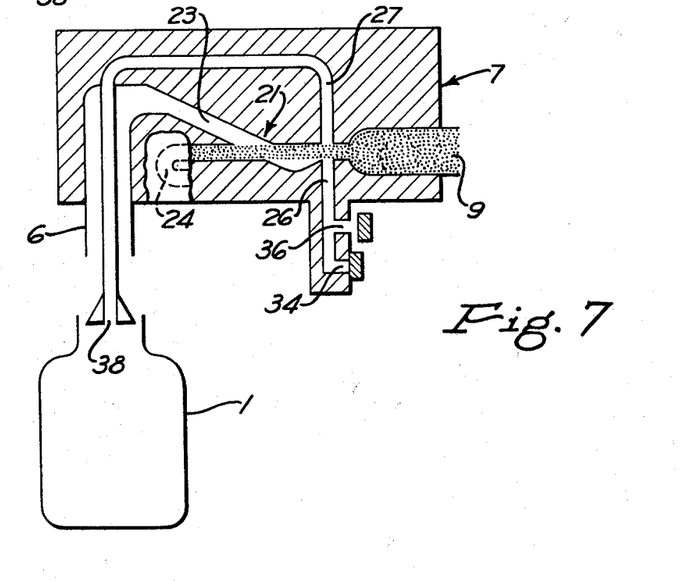

FIG. 7 shows the valve and flow configurations when a container has been presented below a filling nozzle and partially elevated relative to the nozzle. The raising of the container has lifted the bridge element 49 to close port 34, while port 36 is open under both the illustrated and alternative conditions discussed above. Again, since control passage 26 is open, the valve discharge is still through the recirculating outlet 24.

Figures 8, 9:
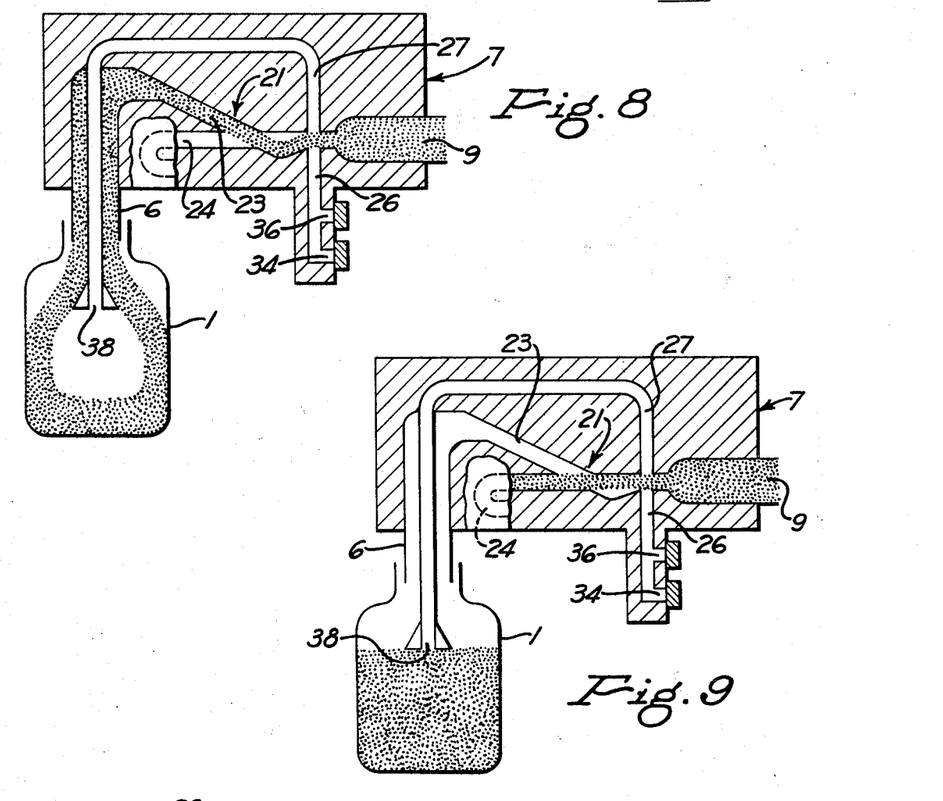

FIG. 8 shows the configurations of valve and fluid flow at the beginning of the filling cycle just after the container has been fully elevated to its final filling position relative to the nozzle. Both ports 34 and 36 are now closed under both the illustrated and alternative conditions discussed above, and the first control passage 26 is therefore closed. Since the second control passage 27 is open, liquid will flow through the valve in such a way as to discharge through nozzle outlet 23 and into the container.

FIG. 9 shows the configuration of these same elements when the container has been filled to a desired level (determined by the elevation of port 38 relative to the container), but the container is still in its fully elevated position. Although ports 34 and 36, and the first control passage 26 as well, are all closed, the second control passage 27 is also closed by the occlusion of its port 28 by liquid in the container. Under these conditions, liquid will be discharged from the valve through recirculating outlet 24 and flow into the container will stop. Often, the liquid in the container will rise temporarily to the predetermined level and occlude port 38, because of turbulence inside the container caused by the splashing of liquid as it is discharged under pressure. When this occurs, flow through the nozzle outlet of the valve may temporarily be stopped, but it will resume when the liquid level inside the container falls after the turbulence subsides. Such shutting off and resumption may occur several times during the filling cycle.

It is a feature of this type of valve that the pressures in control passages 26 and 27 are slightly less than atmospheric, so that, if for any reason, an excess of liquid has been dispensed into the container, the excess will tend to be aspirated through port 38, tube 37, and second control passage 27 into the main stream of liquid flow through the valve.

Figure 10:
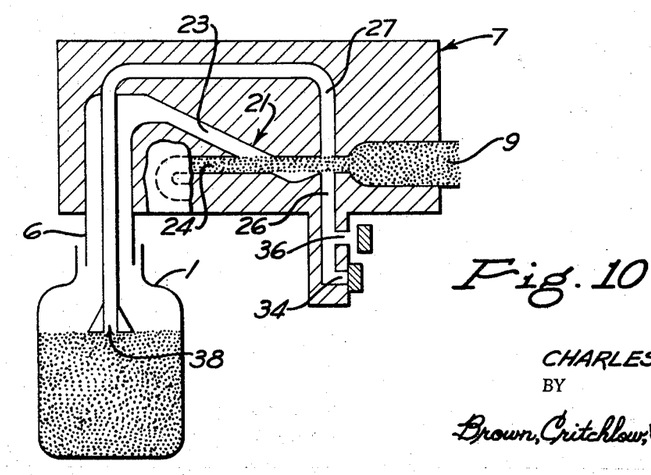

FIG. 10 shows the configuration of the control ports and liquid flow through the valve at the end of the filling cycle, that is, just before the container begins its descent from its fully elevated final filling position relative to the nozzle. Port 36 is open under either of the cam arrangements discussed above, so that the first control passage 26 is open. This assures that the discharge from the valve will be through the recirculating outlet 24, regardless of the open or closed conditions of liquid sensing port 38. Without this provision for opening the first control passage 26, liquid would either continue to be discharged from the nozzle outlet 23 (if the container had not been filled) or would resume discharging through that outlet as soon as the container began its descent, because port 38 would be open. Such a result would cause overfill of the container, which it is one of the objects of this invention to avoid.

When the container reaches its lowermost position after the end of the filling cycle, bridge 49 will again press down on closure member 52 to open control port 34. This assures that liquid will be discharged from the recirculating outlet 24, regardless of whether ports 36 or 38 are open or closed.

It is among the advantage of this invention that the liquid product is diverted in the fluidic valve to the nozzle outlet only (a) after a container has been presented below the nozzle in an initially elevated position, and (b) after that container has been elevated relative to the nozzle into its final filling position. It is an advantage that this double condition can be satisfied by very simple sensing means irrespective of the size of the container. Each container, regardless of size must be initially raised a certain minimum distance relative to the filling nozzle, thereby satisfying the first condition above. The second condition is satisfied, not by sensing means responsive directly to the presence of a container in its fully elevated final filling position (the height of which will vary with different sized containers), but upon the angular position of the filling nozzle corresponding to its position when any container, regardless of size, will have reached its highest elevation relative to the nozzle. In other words, the only adjustment for containers of different height is the usual adjustment of raising or lowering the nozzles as a unit relative to the central columnar support of the filling machine.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In combination with liquid filling apparatus of the type in which a plurality of filling nozzles are supported for rotation about a central vertical axis and rotate over an arcuate path of a certain length that defines a filling cycle for each nozzle where the container being filled thereby is at its fully elevated filling position relative to that nozzle and in which a separate fluidic valve of the type herein referred to having two control passages is associated with each filling nozzle for connecting a source of liquid product under pressure (a) to its associated nozzle when the first control passage is closed and the second control passage is open, and (b) to a recirculating tank when either the first control passage is open or the second control passage is closed, the improvement that comprises the provision of first and second control ports in the first control passage, means for closing the first control port in response to the physical presence and partial elevation of a container relative to the associated nozzle before the beginning of a filling cycle and for opening the same port in response to the final lowering of the container from its filling position after the end of the filling cycle, means for closing the second control port at the beginning of the filling cycle in response to its associated nozzle reaching a predetermined angular position corresponding to its position just after the container has reached its final elevated filling position relative to that nozzle and for opening the second port at the end of the filling cycle in response to the nozzle reaching a second predetermined angular position corresponding to its position just before the container starts downward from its final elevated filling position, and means for closing the second passage in response to the rise of liquid to a predetermined level in the container being filled.

2. Apparatus according to claim 1, in which the means for opening and closing the first control port includes a first closure member, spring means urging the closure member agains the first port to close the port, a container guide for engaging the top of a container and movable with it as the container is elevated into filling position relative to the nozzle, and opening means connected to the guide and operable when the guide is in a lowermost position to hold the closure member against the urging of the spring away from the first port to open that port.

3. Apparatus according to claim 2, in which the opening means includes a guide rod connected to and movable with the container guide, a bridge member extending laterally from the rod and engaging the first closure member when the container guide is at its lowermost position as in the absence of a container.

4. Apparatus according to claim 1, in which the means for opening and closing the second control port includes a second closure member rotatable with the nozzle about said central vertical axis and separately pivotable about a second vertical axis into a first position to close the second port and into a second position to open that port, spring means normally urging the second closure member into one of those two pivotal positions, and cam means operable to urge that closure member into the other of those two pivotal positions, said cam means being actuated by rotation of the filling nozzle between certain angular positions about said central vertical axis.

5. Apparatus according to claim 4, in which the spring means normally urge the second closure member into its second (open) position, and in which the cam means include a cam follower connected to the second closure member and operable when actuated to rotate that closure member into its first (closed) position, and a single fixed arcuate cam strip for actuating the cam follower during a single entire filling cycle of said nozzle.

6. Apparatus according to claim 4, in which the spring means normally urge the second closure member into its first (closed) position, and in which the cam means include a cam follower connected to the second closure member and operable when actuated to rotate that closure member into its second (open) position, and two separate cam strips, one of which is adapted to actuate the cam follower during the raising and the other during the lowering of a container relative to said nozzle.

References Cited

UNITED STATES PATENTS 2,810,406  10/1957  De Milleville ______ 141—148 X
3,277,914  10/1966  Manion ____________ 137—81.5

HOUSTON S. BELL, JR., *Primary Examiner.*

U.S. Cl. X.R.

137—81.5